United States Patent [19]

Yates

[11] 3,917,722

[45] Nov. 4, 1975

[54] PROCESS FOR CONDENSATION OF ALCOHOLS

[75] Inventor: James E. Yates, Ponca City, Okla.

[73] Assignee: Continental Oil Company, Ponca City, Okla.

[22] Filed: Nov. 18, 1974

[21] Appl. No.: 524,600

Related U.S. Application Data

[62] Division of Ser. No. 350,264, April 11, 1973, abandoned.

[52] U.S. Cl. ........... 260/642 C; 252/431; 260/429.9; 260/643 B; 260/643 D; 260/643 G
[51] Int. Cl.² ........................................ C07C 29/00
[58] Field of Search ............................... 260/642 C

[56] References Cited
UNITED STATES PATENTS

| | | | |
|---|---|---|---|
| 2,064,254 | 12/1936 | Fuchs et al. | 260/642 C |
| 2,457,866 | 1/1947 | Carter | 260/642 C |
| 3,642,914 | 2/1972 | Mitchell | 260/642 C |

FOREIGN PATENTS OR APPLICATIONS

| | | | |
|---|---|---|---|
| 891,253 | 9/1953 | Germany | 260/642 C |
| 855,108 | 11/1952 | Germany | 260/642 C |

*Primary Examiner*—Joseph E. Evans
*Attorney, Agent, or Firm*—Cortlan R. Schupbach, Jr.

[57] ABSTRACT

A process for producing higher molecular weight alcohols by condensing at least one lower molecular weight primary alkanol having a methylene group adjacent the hydroxylated carbon atom in liquid phase in the presence of an alkali catalyst and an organic zinc compound, said alkali catalyst being an alkali metal alcoholate or a precursor thereof which forms the alcoholate in the reaction system and said organic zinc compound being defined by

[I]

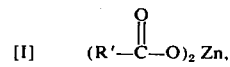

[II]

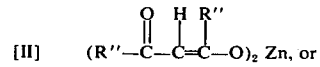

[III]

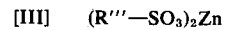

wherein R', R" and R'" are each, independently, saturated or unsaturated, cyclic or acyclic, branch or straight chain hydrocarbon groups, while simultaneously removing water as it forms.

10 Claims, No Drawings

PROCESS FOR CONDENSATION OF ALCOHOLS

This is a division, of application Ser. No. 350,264, filed April 11, 1973 now abandoned.

This invention relates to the condensation of primary alcohols to form alcohol products of higher molecular weight. More particularly, the invention relates to an improvement in the condensation of primary alcohols having a methylene group adjacent to the hydroxylated carbon atom to produce alcohols having a carbon content equal to the sum of the carbon atoms of the two reactant alcohols and which are branched at the beta carbon atom.

According to the well-known Guerbet reaction, a primary or secondary alcohol which contains a methylene group adjacent to the hydroxylated carbon atom may be condensed with itself or with another alcohol of the same class to form a higher alcohol containing the sum of the carbon atoms of the reactant alcohols as the principal product. The classic catalyst for the Guerbet reaction is a strong alkali such as sodium metal, which is generally in the form of its alcoholate during reaction, sodium and potassium hydroxides and the like. Many theories have been advanced as to the particular mechanism of the reaction (for example, see U.S. Pat. Nos. 2,004,350; 2,971,033; 2,829,177 and 3,558,716) and, as indicated in U.S. Pat. No. 2,762,847, there is little general agreement as to what reaction or reactions actually occur during transformation of the lower alcohols to the higher alcohols. It is further indicated that a plurality of different reactions are likely involved so that the process is highly sensitive and unpredictable as to the effect of particular catalysts.

The overall reaction, of course, produces a reaction product mixture which not only contains the higher alcohols but also corresponding higher aldehydes and higher unsaturated alcohols and aldehydes as well as various other by-products due to side reactions. The higher aldehydes and higher unsaturated alcohols and aldehydes present little difficulty since upon hydrogenation of the reaction product they are converted to the desired higher alcohols. The other by-products which have been mentioned in the art include carboxylic acids as well as salts and esters thereof, and ordinarily it is desirable to minimize their formation. One technique for reducing by-products, which is suggested in U.S. Pat. No. 3,328,470, involves the use of less than 3 mol percent alkali catalyst and temperatures in the range of 200°-300°C while continuously removing water formed by the reaction. On the other hand, it is known that in achieving acceptable reaction rates relatively high temperatures (e.g. 290°C) and relatively large quantities of alkali catalyst must be employed, but under these conditions considerable unwanted by-products are also obtained. Thus, it was necessary to balance the reaction rate against the tolerable by-products in the standard Guerbet reaction.

Considerable activity has been involved in developing various approaches to attempt to improve the reaction rate of this process and, at the same time, reduce or at least not increase the by-products. Among the various approaches attempted are the use of certain phosphates as cocatalysts (U.S. Pat. No. 2,762,847); the use of a particular combination catalyst mixture made up of potassium carbonate, magnesium oxide and copper chromite (U.S. Pat. No. 2,971,033); and the use of certain compounds of platinum, palladium, ruthenium and rhodium (U.S. Pat. Nos. 3,479,412 and 3,514,493).

In addition, much effort has been placed on the use of dehydrogenation catalysts, apparently based on the theory that the alcohol reactant is initially dehydrogenated before condensation in the Guerbet reaction and that, by catalyzing this dehydrogenation, the overall reaction rate will be increased (see French Pat. No. 784,656; German Pat. No. 734,468; U.S. Pat. Nos. 2,457,866; 2,757,139 and 2,836,628). Among the dehydrogenation catalysts described in these patents are various compounds of copper, zinc and nickel. These materials along with iron, aluminum, chromium, silver and magnesium are also mentioned in German Pat. Nos. 748,040; 911,730 and 855,108. Various effects have been achieved with dehydrogenation catalysts mentioned in the art and in a particular example in U.S. Pat. No. 2,457,866, zinc stearate is mentioned as a dehydrogenation catalyst to catalyze the condensation of a mixture of 5-ethylnonanol-2 and 2-ethylhexanol-1 but requires a reaction time of 31 hours to achieve a 46% yield based on the 2-ethylhexanol.

It is further indicated in German Pat. No. 855,107 that zinc chloride is an effective catalyst for the Guerbet condensation of butanol but, as shown hereinafter, is significantly less effective than the improvement of this invention.

Illustrating the empirical nature of catalyzing the reaction is U.S. Pat. No. 2,829,177 wherein ferric ions are used to promote the alkali catalyzed condensation while other closely related materials, such as ferrous ions, are ineffective or insufficiently effective to warrant being used.

In accordance with this invention, it has unexpectedly been found that a significantly improved reaction rate may be obtained or, alternatively, significantly milder reaction conditions (temperature, pressure) may be employed in the Guerbet reaction of primary alkanols having methylene groups adjacent to the hydroxylated carbon atoms by carrying out the reaction in the presence of certain organic zinc compounds which, unlike the teachings of the prior art, are not dehydrogenation catalysts under conditions of the reaction. Not only is the reaction rate improved but the selectivity of the overall process is substantially maintained as indicated by the hydrogenated product. Moreover, as previously mentioned, the reaction product as a whole may be hydrogenated to convert the higher aldehydes and higher unsaturated alcohols and aldehydes to the corresponding higher alcohol products. With reaction products produced from mixtures of alcohol reactants by the standard Guerbet reaction, that is, the simple alkali catalyzed condensation of the alcohols, it has been found that upon such hydrogenation a product is produced which contains significant quantities of mixed paraffins some of which have boiling points similar to those of the desired higher alcohol products and thus cannot be separated by the usual distillation techniques. It is believed that these paraffins are the result of dimeric dienes produced as by-products during the condensation reaction. With the present invention there is a reduction in the quantity of these paraffins in the hydrogenated reaction product which is the direct result of a reduction in the amount of dimeric dienes produced during the condensation reaction. This enables one to produce a higher alcohol product having greater purity by standard distillation techniques. However, it is emphasized that the selectivity of the process remains substantially unaltered in that apparently, while the precursors for the paraffins (dimeric dienes) are reduced, there is a corresponding increase in other by-products which are readily separable upon distillation. Thus, while the selectivity of the process remains substantially the same insofar as the desired higher alcohol products and compounds convertible to the same upon hydrogenation are concerned, the distibution of the types of by-products is altered in favor of increasing the quantity of readily separable high boiling by-products against the more difficult to separate by-products (paraffins) after hydrogenation of the reaction product.

In describing the invention in detail, the alkanols which may be used are primary alkanols having methylene groups adjacent the hydroxylated carbon atoms. These alkanols may best be illustrated by the formula

R—CH$_2$—CH$_2$OH wherein R can be a straight or branch chain alkyl group. While there is no limitation as to the number of carbon atoms R may contain from a theoretical standpoint, more practical considerations indicate that R most likely will contain about 2 to 28 carbon atoms. Thus, the preferred primary alkanols are those which are branch or straight chain, have 4 to 30 carbon atoms and have a methylene group adjacent the hydroxylated carbon atom. Illustrative of these preferred primary alkanols are 1-butanol; 1-octanol; 1-hexadecanol; 1-octadecanol; 1-eicosanol; 1-dodecanol; 1-heptadecanol; 1-hexacosanol; 1-tetracosanol; 1-pentanol; 1-tetradecanol; 3,3-dimethyl-1-butanol; 4-methyl-1-pentanol; 4-methyl-1-heptanol; 3,3-dimethyl-1-hexanol; 4,4-dimethyl-1-heptanol, 4,4-dimethyl-1-hexanol; 3,4-dimethyl-1-heptanol; 3,4-dimethyl-1-hexanol; and the like. The alcohols may be reacted in their pure form or as mixtures. In particular, alcohol mixtures such as those generally referred to as "Oxo" alcohols having methylene groups adjacent the hydroxylated carbon atoms are suitable as are mixtures of linear alkanols.

The above-described alkanols are reacted in the presence of an alkali catalyst as is well-known and heretofore described in the literature relative to the Guerbet reaction. These alkali catalysts include the alkali metals, alkali metal hydroxides, alkali metal oxides and alkali metal alcoholates. The metals, hydroxides and oxides will, of course, form the alcoholates in the reaction system wherein the hydrocaron moieties of the alcoholate correspond to the hydrocarbon moieties of the alcohol reactants. When preformed alkali metal alcoholates are used it is not necessary that they correspond with the alcohol reactants. Illustrative of suitable alkali catalysts are metallic sodium or potassium, lithium hydroxide, sodium hydroxide, potassium hydroxide, sodium oxide, potassium oxide, sodium alcoholates, potassium alcoholates, and the like. Obviously other alkali metal compounds may be used provided that they will form the corresponding alcoholates under reacction conditions. Such comounds include the alkali metal bisulfites.

The amount of alkali catalyst employed forms no part of this invention and the effects of various quantities of such catalyst are known in the art. Since large quantities of alkali catalyst lead to increased amounts of unwanted by-products and since good reaction rates are achieved by the improvement of this invention with low levels of alkali catalyst, it is normally not desirable nor is it necessary to exceed an amount of alkali catalyst equivalent to about 4 mols of the alkali metal per 100 mols of alcohol reactants. Generally, an amount of alkali catalyst equivalent to about 0.1 to 4 mols of the alkali metal per 100 mols of alcohol reactants may be employed with satisfactory results, with preferred amounts being equivalent to about 0.5 to 4 mols of the alkali metal on the same basis.

As mentioned hereinbefore, the improvement of this invention involves carrying out the condensation reaction of the above-described primary alkanols catalyzed by the above-described alkali catalysts in the presence of certain organic zinc compounds which are not dehydrogenation catalysts under conditions of the condensation reaction. The organic zinc compounds contemplated are salts of certain carboxylic acids, β-diketones and sulfonic acids and are defined by the following structure:

[I] $(R'-\underset{\underset{O}{\|}}{C}-O)_2 Zn,$

[II] $(R''-\underset{\underset{O}{\|}}{C}-\underset{\underset{H}{|}}{C}=\underset{\underset{R''}{|}}{C}-O)_2 Zn,$ and

[III] $(R'''-SO_3)_2 Zn.$

In each of the above structures, R', R'' are saturated or unsaturated, cyclic or acyclic, branch or straight chain hydrocarbon groups. Mixtures of such salts may be used.

The organic zinc compounds defined by structure [I] above include those compounds wherein R' has 1 to 30 carbon atoms. Illustrative of these compounds are zinc salts of acetic acid, butyric acid, propionic acid, valeric acid, caproic acid, enanthoic acid, caprylic acid, pelargonic acid, decanoic acid, lauric acid, myristic acid, palmitic acid, stearic acid, eicosanoic acid, behenic acid, isobutyric acid, isovaleric acid, 2-ethylhexanoic acid, isostearic acid, crotonic acid, undecylenic acid, oleic acid, linoleic acid, benzoic acid, o-, m- and p-toluic acid, dimethylbenzoic acid, naphthoic acid, abietic acid, fatty acids of tall oil, naphthenic acid (mixture of C$_8$ to C$_{19}$ acids as indicated in *Advanced Organic Chemistry*, Fieser and Fieser, 3rd Edition, 1956, p 247-48), resin acids, and the like.

The organic zinc compounds defined by structure [II] above include those compounds wherein each R'', independently, has 1 to 10 carbon atoms. Illustrative of these compounds are zinc salts of β-diketones such as 2,4-pentane-dione (commonly referred to as zinc acetylacetonate); 2,4-heptanedione; 3,5-heptanedione; 2,6-dimethyl-3,5-heptanedione; 2,4-nonanedione; 3,5-nonanedione; 4,6-nonanedione; 5,7-undecanedione; 2,2,6,6-tetramethyl-3,5-heptanedione; 1,3-diphenyl-1,3-propanedione; and the like.

The organic zinc compounds wherein R''' has 6 to 54 carbon atoms. Illustrative of these compounds are zinc salts of p-toluene sulfonic acid; naphthalene-β-sulfonic acid; benzene sulfonic acid; alkyl and dialkylbenzene suflonic acids wherein the alkyl groups have 2 to 24 carbon atoms such as dodecylbenzene sulfonic acid, octylbenzene sulfonic acid, didodecylbenzene sulfonic acid, decylbenzene sulfonic acid, hexadecylbenzene sulfonic acid, ditetradecylbenzene sulfonic acid, dinonylbenzene sulfonic acid, heptadecyl sulfonic acid, dibutylenzene sulfonic acid and tridecylbenzene sulfonic acid; sulfonic acid derived from monoolefins (both 1-olefins and pendent olefins), preferably olefins having 8 to 30 carbon atoms, such as 1-dodecene sulfonic acid, 1-eicosene sulfonic acid, 2-heptene sulfonic acid, 1-pentadecene sulfonic acid, 2-tridecene sulfonic acid and 1-tetradecene sulfonic acid (it is understood that these sulfonic acids derived from mono-olefins may be in admixture with hydroxyalkane sulfonic acids as described in U.S. Pat. No. 3,409,647 all of which will form zinc salts); alkyl sulfonic acids wherein the alkyl group has 6 to 30 carbon atoms such as decyl sulfonic acid; dodecyl sulfonic acid; 2-ethylhexyl sulfonic acid; heptadecyl sulfonic acid; pentadecyl sulfonic acid and tridecyl sulfonic acid; cyclohexyl sulfonic acid; and the like.

The above zinc compounds may be employed as such or in solvent solution as in the case of commercially available zinc naphthenate.

Catalytic amounts of the above defined organic zinc compounds are employed in the improved Guerbet reaction of this invention. Generally, this will be an amount sufficient to provide at least 10 ppm zinc metal based on the primary alkanol reactants. While there is, theoretically, no upper limit on the quantity of zinc which may be present it is pointed out that very high quantities (e.g. 5000 ppm) may interfere with the alkali catalyst necessitating the use of greater quantities of the alkali catalyst than would normally be required to achieve the desired reaction parameters. Without intending to limit the invention in any way, it is preferred to employ about 50 to 200 ppm zinc metal based on the alkanol reactants.

the improved reaction can generally be carried out over a wide range of temperatures similarly as is known in connection with Guerbet reactions. These temperatures will usually range from about 80°C to about 300°C, preferably from about 200°C to about 300°C. The particular temperature employed will depend upon the primary alkanol reactants, the particular alkaline condensing agent employed and other operating considerations as understood in the art.

It is essential that water produced from the condensation reaction be removed as the reaction progresses, otherwise, the oxidation of the alcohols to carboxylic acids will be increased with a corresponding loss in alkali catalyst through subsequent neutralization of the acids. As indicated in the prior art, water removal from the Guerbet reaction may be effected by employing a dehydrating agent such as calcium oxide or magnesium oxide. However, it is preferred to remove water by azeotropic distillation. The latter procedure is particularly advantageous in the condensation of low molecular weight alcohol while operating under atmospheric and super-atmospheric pressure.

In the improved process of the invention, it is generally desirable to employ alkali catalysts which contain a minimum of water since any water introduced with the catalyst must be subsequently removed during reaction as pointed out above. This is not to say that no water can be so introduced and in some cases it may be very advantageous from a materials handling point of view to add the alkali catalyst in the form of a reasonably concentrated aqueous solution. However, it is believed that caution should be exercised when employing those organic zinc compounds having limited solubility in the alkanol phase to avoid introducing such amounts of water which would have the effect of preferentially dissolving the zinc compounds and thereby inhibit the catalytic effects achieved through the improvement of this invention. Such care should be exercised particularly with orgnic zinc compounds structure [I]to wherein R' contains less than four or five carbon atoms.

Except as the above considerations may influence the conduct of the reaction, pressure is not an essential aspect of the process. However, it is desirable to maintain the reactants in a liquid state and thus sufficient pressure will be employed where necessary to achieve this physical state.

Inert diluents may be employed in the reaction as desired. Such diluents include hydrocarbons such as paraffins, olefins, benzene, toluene, xylene, etc.

As previously indicated, the reaction product from the condensation reaction will generally contain, in addition to the higher molecular weight saturated alcohols, higher molecular weight aldehydes and higher molecular weight unsaturated alcohols and aldehydes as well as certain minor amounts of other by-products. Because of the presence of the aldehydes and unsaturated alcohols and aldehydes, it is generally desirable to hydrogenate the reaction product before recovering the product alcohols. This will have the effect of converting the higher molecular weight aldehydes and unsaturated alcohols and aldehydes to the product alcohols and thus increase the overall yield of the desired product.

In recovering the product alcohols from the hydrogenated reaction product, conventional distillation techniques may be employed whereby unreacted lower molecular weight alcohols will first be separated followed by the product alcohols with the higher boiling by-products remaining behind in the distillation bottoms. When employing a single alkanol reactant any dimeric diene present in the reaction product will be converted to the corresponding paraffin upon hydrogenation and may be separated from the product higher alcohols through distillation. However, when a mixture of alcohol reactants are employed some of the dimeric dienes converted to paraffins upon hydrogenation will not be readily separable from the product higher alcohols by simple distillation due to the similary in boiling points. This emphasizes again one of the previously mentioned advantages of the process of this invention when using mixed alkanol reactants wherein the distribution of by-products in the Guerbet reaction is shifted from the dimeric dienes to the higher boiling by-products. By reducing the amount of dimric dienes in the Guerbet reaction product there results a decreased content of the contaminating paraffins in the product mixed alcohols afer hydrogenation and recovery by distillation.

The invention will be further illustrated by the following illustrative examples:

EXAMPLE 1

Comparative experiments were conducted to demonstrate the effectiveness of the improvement of the invention in significantly reducing reaction time while retaining relatively mild reaction conditions for the Guerbet reaction and in altering the distribution of by-products while substantially maintaining the selectivity of the process in producing higher alcohols and the higher saturated aldehydes and unsaturated alcohols convertible to the higher alcohols upon simple hydrogenation.

The control experiment was conducted by charging 250 g (1.58 mol) of 1-decanol and 2.1 g (0.0318 mol) KOH pellets (85% KOH, 15% water) to a 500 ml three-necked flask equipped with a Dean-Stark azeotrope trap and reflux condenser, thermometer and stirrer. The reaction mixtures was heated to reflux temperatures and maintained at reflux until about 8 ml water was produced and collected. This represented about 50% conversion of the 1-decanol, 1 ml water derived from the KOH pellets and 7 ml water from the condensation reaction. The time required to produce the last 7 ml of water was about 7.25 hours. The crude reaction mixture was acid washed with 25% $H_2SO_4$ followed by water washing to remove the alkali catalyst. After removing the water the entire reaction mixture was analyzed by gas chromatography which indicated about 51% by weight converion of the 1-decanol. The reaction product analyzed as about 89% by weight saturated alcohol having 20 carbon atoms, about 4 % by weight alcohol precursor having 20 carbon atoms (saturated aldehyde and unsaturated aldehyde and alcohol), about 5% by weight dimeric diene having 20 carbon atoms and about 2% by weight higher boiling by-products.

In a first experiment involving the invention, the above procedure was carried out additionally including 0.032 ml zinc naphthenate solution (8% Zn) obtained commercially from Carlisle Chemical. The zinc naphthenate was completely miscible in the reaction mixture and the amount employed wa sufficient to provide about 10 ppm zinc based on the 1-decanol. The reaction time to produced the last 7 ml of water was noted to be about 2.7 hours. After work up of the crude reaction mixture as described in the previous experiment gas chromatography analysis was performed which showed about 53% by weight conversion of 1-decanol with the reaction product comprising about 90.4% by weight saturated alcohol having 20 carbon atoms, about 3.9% by weight alcohol precursor having 20 carbon atoms, about 2.8% by weight dimeric diene having 20 carbon atoms and about 2.9% by weight higher boiling by-products.

Another experiment according to the invention was carried out as described above except that about 0.18 ml zinc naphthenate solution was employed to give approximately 50 ppm zinc in the reaction system based on 1-decanol. The reaction time required to obtain the last 7 ml of water was about 1.1 hours. Gas chromatography analysis indicated 57% by weight conversion of the 1-decanol and a reaction product comprising about 86.1% by weight saturated alcohol having 20 carbon atoms, about 6.3% by weight alcohol precursor having 20 carbon atoms, about 2.0% by weight dimeric diene having 20 carbon atoms and about 5.6% by weight higher boiling by-products.

A further experiment according to the invention was carried out as described except that about 0.35 ml zinc naphthenate solution was employed to give approximately 100 ppm zinc in the reaction system based on 1-decanol. The reaction time required for the last 7 ml of water to form was about 1.2 hours. Gas chromatography analysis indicated conversion of the 1-decanol of about 59% by weight. The reaction product analyzed about 86.0% by weight saturated alcohol having 20 carbon atoms, about 6.7% by weight alcohol precursor having 20 carbon atoms, about 1.8% by weight dimeric diene having 20 carbon atoms and about 5.5% by weight higher boiling by-products.

Another experiment involving the invention was performed as described above except that about 3.5 g zinc octoate was substituted for the zinc naphthenate. The zinc octoate was also completely miscible with the reaction mixture and the amount employed was sufficient to provide about 2500 ppm zinc based on the 1-decanol. The reaction time to produce the last 7 ml of water was noted to be about 1.8 hours. Gas chromatography analysis indicated a conversion of 1-decanol of about 52% by weight. The reaction product analyzed about 87.2% by weight saturated alcohol having 20 carbon atoms, about 8.6% by weight alcohol precursor having 20 carbon atoms, about 1.3% by weight dimeric diene having 20 carbon atoms and about 2.9% by weight of higher boiling by-products.

The above data is tabulated below in Table I.

TABLE I

| Zn (ppm) | Reaction Time (hr) | Conversion (wt%) | $C_{20}$ Alcohol (wt%) | $C_{20}$ Alcohol Precursor[c] (wt%) | Diene (wt%) | HB[d] (wt%) |
|---|---|---|---|---|---|---|
| 0 | 7.25 | 51 | 89.0 | 4.0 | 5.0 | 2.0 |
| 10[a] | 2.7 | 53 | 90.4 | 3.9 | 2.8 | 2.9 |
| 50[a] | 1.1 | 57 | 86.1 | 6.3 | 2.0 | 5.6 |
| 100[a] | 1.2 | 59 | 86.0 | 6.7 | 1.8 | 5.5 |
| 2500[b] | 1.8 | 52 | 87.2 | 8.6 | 1.3 | 2.9 |

[a]-provided by zinc naphthenate
[b]-provided by zinc octoate
[c]-includes saturated aldehyde and unsaturated aldehyde and alcohol
[d]-readily separable higher boiling by-products It is pointd out that the reaction products indicated in Table I, upon hydrogenation, will result in a total desired product alcohol having 20 carbon atoms which will equal the sum of the amounts of $C_{20}$ alcohol and $C_{20}$ alcohol precursor as listed. The diene will be converted to the corresponding paraffin having 20 carbon atoms. It is evident, on this basis, that the total selectivity to desired products ($C_{20}$ alcohol and $C_{20}$ alcohol precursor) remains substantially the same for each experiment. However, the dimeric diene content is markedly reduced in the unwanted by-products.

EXAMPLE 2

A series of experiments were conducted comparing the improveent of the invention with a disclosure in German Patent 855,107 suggesting the use of zinc chloride in conducting the Guerbet reaction to produce higher molecular weight alcohols and also with the use of zinc oxide, a known dehydrogenation catalyst, as suggested in the prior art. In each of the experiments, 250 g of 1-decanol, 2.1 g of KOH pellets (85% KOH) and a quantity of zinc salt sufficient to provide the ppm zinc indicated in Table II to follow based on the 1-decanol, were charged to a 500 ml three-necked reaction flask equipped with a Dean-Stark azeotrope trap, reflux condenser, thermometer and stirrer. The reaction mixture was heated to reflux temperatures and maintained at reflux until about 8 ml of water were produced and collected which indicated approximately 50% conversion of the 1-decanol (1 ml water from KOH and 7 ml water from the condensation reaction). The time required to produce the last 7 ml of water was measured and is indicated in Table II. For comparision, the control from Example 1 using no zinc is also included in the table.

TABLE II

| Zn Salt | Conc (ppm Zn) | Temp °C | Reaction Time (hr) |
|---|---|---|---|
| Control | None | — | 7.25 |
| Oxide | 100 | 228–248 | 2.7 |
| Chloride | 100 | 225–248 | 2.6 |
| Acetate | 100 | 229–245 | 1.3 |
| Octoate | 100 | 225–247 | 1.2 |
| Naphthenate | 50 | 230–248 | 1.1 |

From the above data it is evident that while zinc oxide and zinc chloride may provide some improvement in the Guerbet reaction in terms of reaction rate the organic zinc compounds contemplated by this invention provide reaction rates which are significantly improved over that obtained with the zinc chloride.

EXAMPLE 3

Following the procedure described in Example 2, 250 g of 1-decanol, 2.1 g KOH pellets (85%) and 0.05 g of zinc acetylacetonate (equivalent to about 50 ppm Zn based on the alkanol) were charged to the reaction flask. The reaction was carried out by heating the reaction mixture to reflux and maintaining reflux conditions (228°–247°C) until about 8 ml of water were produced and collected indicating about 50% conversion of the alkanol. The reaction time to collect the last 7 ml of water was observed to be about 1.5 hours.

EXAMPLE 4

The effect of the invention in reducing reaction time for the Guerbet process was further demonstrated by charging about 250 g 1-decanol, 2.1 g KOH pellets (85% KOH) and 0.08 g zinc naphthenate solution (8% Zn) to provide about 25 ppm zinc based on the 1-decanol, to a 500 ml three-necked reaction flask equipped with a Dean-Stark azeotrope trap, reflux condenser, thermometer and stirrer. The reaction mixture was heated to reflux temperatures and maintained at reflux (230°–245°C) until about 8 ml of water were produced and collected which indicated approximately 50% conversion of the 1-decanol (1 ml water from the KOH and 7 ml water from the condensation reaction). The time required to produce that last 7 ml of water was about 1.6 hours.

EXAMPLE 5

According to the procedure set forth in Example 2, 250 g of 1-decanol and 2.1 g KOH pellets (85%) were mixed and charged to the reaction flask followed by addition of about 0.14 g of zinc octoate (equivalent to about 100 ppm Zn in solution). After thorough mixing the reaction was carried out by heating to reflux and maintaining reflux conditions (224–247°C) until about 8 ml of water was produced and collected indicating about 50% conversion of the 1-decanol. The reaction time to collect the last 7 ml of water was observed to be about 1.2 hours.

The above experiment was essentially repeated except that the mixture of KOH and 1-decanol were heated to reflux and water was removed to substantially convert the KOH to potassium decanoxide followed by addition of the 0.14 g of zinc octoate. Reflux conditions were maintained (225°–250°C) until 7 ml of water were produced and collected indicating about 50% conversion of the 1-decanol. The reaction time to collect the 7 ml of water was observed to be about 1.2 hours.

EXAMPLE 6

Following the procedure described in Example 2, 2108 g of a commercial mixture of 1-alkanols having 16-20 carbon atoms and essentially no branching (ALFOL16-20 alcohol), 116 ml mixed xylenes as diluent, 23.2 g of KOH pellets (85%) and 2.6 g zinc naphthenate (equivalent to about 100 ppm Zn based on the 1-alkanols) were charged to the reaction flask and heated to reflux. Reflux conditions (233°–272°C) were maintained for about 2.5 hours while continuously collecting the water product. Based on the water collected it was estimated that conversion of the 1-alkanols was about 80%.

EXAMPLE 7

A similar procedure as described in Example 5 was carried out except that about 320 g of an essentially straight chain commmercial 1-alkanol mixture having 20 carbon atoms and above (ALFOL 20+ alcohol) which had been distilled to 85% overhead, 240 ml mixed xylenes as inert diluent, 32.0 g KOH pellets (85%) and 2.5 g zinc naphthenate (equivalent to about 100 ppm Zn based on the 1-alkanol) were charged to the reaction flask and heated to reflux. Reflux conditions (240°–256°C) were maintained for about 4.5 hours while continuously collecting the water produced. Based on the water collected, it was estimated that about 70% conversion of the 1-alkanols was obtained.

EXAMPLE 8

A further experiment similar to those described in Examples 6 and 7 was performed by charging 500 g of ALFOL 16-20 alcohol, 60 ml of mixed xylenes as diluent, 5.0 g of KOH pellets (85%) and 0.7 g of zinc naphthenate (equivalent to about 100 ppm Zn based on the alcohol) to the reaction flask and heated to reflux. Reflux conditions (230°–243°C) were maintained for about 2.2 hours while collecting the water produced. It was estimated that about 70% conversion of the alcohol was obtained based on the water collected.

EXAMPLE 9

A series of experiments were conducted using the general procedure described in Example 2 except that rather than refluxing to remove water while returning the alcohol to the reaction the reaction mixture was heated to vaporize the water without alcohol boil-up. Each experiment involved charging 250 g of 1-decanol, 2.1 g KOH pellets (85%) and 0.14 g of zinc octoate (about 100 ppm Zn based on the 1-alkanol) to the reaction and heating to about 238°–242°C. The temperature was maintained until about 8 ml of water were produced and collected indicating about 50% conversion of the 1-dodecanol. In experiment A, water was removed solely by vaporization whereas in experiments B, C and D nitrogen sweeps of 50 ml/min, 120-140 ml/min and 250 ml/min were employed respectively. The reaction times to obtain the last 7 ml of water in the experiments were A-1.3 hours, B-1.4 hours, C-0.8 hour and D-0.7 hour. This series of experiments demonstrates the effect of rapidly removing water as it forms during the reaction.

EXAMPLE 10

A series of continuous reactions were conducted in a 1 liter stainless steel reactor equipped with a stirrer, a Dean-Stark azeotrope trap, reflux condenser and temperature recorder. In each experiment a solution of alcohol and either zinc naphthenate solution [(8% Zn) 1.3 g/1000 g alcohol, equivalent to about 100 ppm] or zinc octoate [0.56 g/1000 g alcohol equivalent to about 100 ppm] was continuously metered a specified rate into the mid-section of the reactor along with a specified rate of aqueous KOH (45%). A control run was performed omitting the zinc compound. The reactions were conducted under reflux conditions and some pressure. Water was continuously removed overhead and the reaction product was continuously withdrawn from the bottom of the reactor at a rate sufficient to provide the predetermined residence time taking into consideration the feed rates of the reactants and the overhead water removal. After each reaction reached steady-state conditions a sample of the reaction product was washed first with 25% $H_2SO_4$ and then with water followed by drying. The sample was then hydrogenated using standard techniques with a nickel/kieselguhr catalyst and then analyzed by gas chromatography for conversion and selectivity. In three runs, no gas chromatography analysis was made and conversion was estimated on the basis of water collected. The conditions and results of these runs are set forth in Table III.

netic stirrer and a reflux condenser. The materials were blanketed with nitrogen and then refluxed for about 2 hours at about 229°–231°C which should cause dehydrogenation of the 1-decanol to carbonyl compounds if the zinc naphthenate functions as a dehydrogenation catalyst. At the end of this time a sample of the refluxed material was withdrawn, the zinc removed and carbonyl content analyzed as described above. The carbonyl content of the refluxed 1-decanol was found to be about 131 ppm.

The results demonstrate that zinc naphthenate cannot be regarded as a dehydrogenation catalyst.

EXAMPLE 12

In view of the greater ease with which 2-alkanols would be expected to dehydrogenate, similar tests as those described in Example 11 were conducted using 2-octanol obtained from Eastman Chemicals. The starting 2-octanol was initially analyzed for carbonyl content and found to contain about 2480 ppm. About 20 g of 2-octanol and a quantity of zinc naphthenate sufficient to provide about 100 ppm zinc metal based on the 2-octanol were charged to a reaction flask equipped with a magnetic stirrer and a reflux condenser. After blanketing the materials with nitrogen the materials were heated to reflux (about 170°C) and maintained for about 5½ hours. The refluxed 2-octanol was then analyzed and found to contain about 2272 ppm carbonyl function.

Again, the results demonstrate that the zinc com-

TABLE III

| Run No. | Feed Rates (ml/hr) | | Residence Time (hr) | Temp (°C) | Press (psig) | Conversion (%) | Selectivity (wt%) | | |
|---|---|---|---|---|---|---|---|---|---|
| | Alcohol | KOH | | | | | Product** | Paraffins*** | High Boilers |
| 1-A | 400 | 4.1 | 1 | 284 | 70 | 52 | 92.8 | 3.4 | 3.8 |
| 2-B | 400 | 4.1 | 1 | 261 | 40 | 52 | 93.8 | 1.9 | 4.3 |
| 3-B | 400 | 2.1 | 1 | 277 | 70 | 27 | 95.5 | 2.8 | 1.7 |
| 4-B | 400 | 4.1 | 1 | 266 | 45 | 55–60* | — | — | — |
| 5-B | 400 | 4.2 | 1 | 260 | 40 | 53 | 91.8 | 2.2 | 5.9 |
| 6-B | 500 | 5.4 | 0.5 | 278 | 60 | 56 | 92.8 | 2.6 | 4.6 |
| 7-B | 400 | 4.1 | 1 | 262 | 40 | 50–55* | — | — | — |
| 8-C | 200 | 2.1 | 2 | 240 | 22 | 50 | 96.1 | 1.3 | 2.6 |
| 9-D | 400 | 4.1 | 1 | 288 | 71 | 35–40* | — | — | — |

A-Control, no zinc compound, mixture of straight-chain 1-alkanols having 6–10 carbon atoms as feed (ALFOL 6–10 alcohol)
B-Zinc naphthenate solution (8% Zn) and ALFOL 6–10 alcohol feed
C-Zinc octoate and ALFOL 6–10 alcohol feed
D-Zinc naphthenate solution (8% Zn) and mixture of substantially straight-chain 1-alkanols having 7, 9 and 11 carbon atoms (Santicizer 7–11) feed

*-Estimated conversion based on water produced
**-Alcohol having 12–20 carbon atoms
***-Paraffins having 12–20 carbon atoms (some of which is not readily separable by conventional distillation from the product due to similar boiling points).

As indicated hereinbefore, the organic zinc compounds are not dehydrogenation catalysts under reaction conditions. This has been demonstrated by some simple dehydrogenation tests performed on 1-decanol and, additionally, on 2-octanol and 2-undecanol since the 2-alkanols would be expected to dehydrogenate more readily than the 1-alkanols.

EXAMPLE 11

A sample of 1-decanol (ALFOL $C_{10}$ linear alcohol) was initially analyzed for carbonyl content by the standard colorimetric method using 2,4-dinitrophenylhydrazine and found to contain about 14 ppm carbonyl function. Then, to evaluate the effectiveness of zinc naphthenate as a dehydrogenation catalyst, 250 g of the 1-decanol and a quantity of zinc naphthenate to provide 100 ppm zinc metal based on the 1-decanol were added to a reaction flask equipped with a magpounds contemplated for use in the invention do not function as dehydrogenation catalysts.

EXAMPLE 13

A series of tests similar to those described in Examples 11 and 12 were conducted using 2-undecanol, a secondary alcohol having a similar boiling point as 1-decanol.

The 2-undecanol was first prepared by hydrogenating 2-undecanone obtained from Eastman Chemicals in a conventional manner followed by distillation with the 2-undecanol being recovered as a cut taken between 122° and 124°C (about 77 wt.% of the total product). This 2-undecanol was analyzed and found to contain about 461 ppm carbonyl function.

A first sample of 2-undecanol (25 g), as prepared above, together with a quantity of zinc naphthenate sufficient to provide 100 ppm zinc metal based on the 2-undecanol were charged to a reaction flask equipped with a magnetic stirrer and a reflux condenser. After blanketing with nitrogen the materials were heated to reflux (about 230°–233°C) and maintained for about 1 hour. The refluxed 2-undecanol was then analyzed and found to contain about 1519 ppm carbonyl function.

The above procedure was repeated with another 25 g sample of the 2-undecanol except that refluxing was extended to two hours. The refluxed 2-undecanol was analyzed and found to contain about 777 ppm carbonyl function.

A third sample of the 2-undecanol (25 g) was refluxed for two hours as described above except no zinc compound was included. The refluxed 2-undecanol was analyzed and found to contain about 860 ppm carbonyl function.

Based on the above results, it is concluded that the zinc compounds employed in the invention do not function as dehydrogenation catalysts.

Curiously, similar tests using zinc oxide as the zinc material indicated that zinc oxide does not function as a dehydrogenation catalyst although so indicated in the prior art.

While the zinc compounds useful in the invention do not function as dehydrogenation catalysts, that is, they do not function to catalyze a unimolecular reaction producing hydrogen, it is theorized that they do function as cocatalysts for the oxidation of the alcohols which in some way is involved in the overall reaction mechanism.

Thus having described the invention in detail it will be understood by those skilled in the art that certain variations and modifications may be made without departing from the spirit and scope of the invention as disclosed herein and defined in the appended claims.

I claim:

1. A process for producing higher molecular weight alcohols by condensing at least one lower molecular weight primary alkanol having a methylene group adjacent to the hydroxylated carbon atom said process being carried out in liquid phase at about 80° to about 300°C in the presence of an alkali catalyst and an organic zinc compound, said alkali catalyst being an alkali metal, alkali metal hydroxide, alkali metal oxide, alkali metal bisulfite or alkali metal hydrocarbon alcoholate and said organic zinc compound beng defined by $$(R''' - SO_3)_2 Zn$$

wherein $R'''$ is a saturated or unsaturated, cyclic or acyclic, branch or straight chain hydrocarbon group, while simultaneously removing water as it forms.

2. A process according to claim 1 wherein $R'''$ has 6 to 54 carbon atoms.

3. A process according to claim 2 wherein the zinc compound is zinc ($C_2$—$C_{24}$ alkyl) benzene sulfonate, zinc di($C_2$—$C_{24}$ alkyl) benzene sulfonate, zinc ($C_8$—$C_{30}$) alkylene sulfonate, zinc ($C_6$—$C_{30}$) alkyl sulfonate, zinc p-toluene sulfonate, zinc naphthalene $\beta$-sulfonate, or zinc benzene sulfonate.

4. A process according to claim 1 wherein the alkali catalyst is sodium hydroxide, potassium hydroxide, sodium alcoholate, potassium alcoholate, metallic sodium, or metallic potassium.

5. A process according to claim 1 wherein the alkali catalyst is employed in an amount equivalent to about 0.1 to 4 mols of the alkali metal per mol of primary alkanol.

6. A process according to claim 5 wherein the zinc compound is employed in an amount sufficient to provide at least 10 ppm zinc metal based on the primary alkanol.

7. A process according to claim 1 wherein the lower molecular weight primary alkanol is defined by
R—CH$_2$—CH$_2$OH wherein R is a straight or branch chain alkyl group having 2 to 28 carbon atoms.

8. A process according to claim 7 wherein the primary alkanol is a mixture of alkanols.

9. A process according to claim 8 wherein the primary alkanol is a mixture of $C_6$ to $C_{10}$ alkanols.

10. A process according to claim 8 wherein the primary alkanol is a mixture of $C_{16}$-$C_{20}$ alkanols.

* * * * *